UNITED STATES PATENT OFFICE 2,682,540

PENICILLIN SALT OF α-PHENYL-β-PIPERI-
DINOETHYL CARBANILATE

Frank H. Buckwalter, De Witt, and Alphonse P.
Granatek, Syracuse, N. Y., assignors to Bristol
Laboratories Inc., Syracuse, N. Y., a corporation of New York No Drawing. Application March 13, 1952,
Serial No. 276,458

4 Claims. (Cl. 260—239.1)

The present invention relates to a new, non-toxic, water-insoluble, amine salt of penicillin, more particularly a penicillin salt of α-phenyl-β-piperidinoethyl carbanilate, which is capable of exerting a repository antibiotic action and is also useful for oral, therapeutic administration and for external application and for use as a supplement in animal and poultry feeds.

The new penicillin salt of the present invention has the following formula

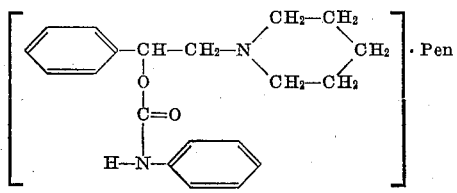 · Pen wherein Pen designates an acid penicillin radical or an active moiety thereof, capable of forming an addition salt with α-phenyl-β-piperidinoethyl carbanilate.

The product of the present invention may be obtained by reaction of penicillin acid with α-phenyl-β-piperidinoethyl carbanilate in a water-immiscible organic solvent and by the metathetical reaction of a water-soluble penicillin salt and a water-soluble salt of α-phenyl-β-piperidinoethyl carbanilate in water.

A more comprehensive understanding of this invention is obtained by reference to the following examples.

EXAMPLE I

*Alpha-phenyl-beta-piperidinoethyl carbanilate hydrochloride*

A solution of 25.6 g. (0.125 mole) of N-(β-hydroxy-β-phenethyl)-piperidine of M. P. 71.0–72.5° C. and 14.9 g. (0.125 mole) of phenyl isocyanate in 150 cc. dry ether is refluxed for three hours. After cooling, the solution is saturated with hydrogen chloride. After standing in the cold, the precipitate of α-phenyl-β-piperdinoethyl carbanilate hydrochloride is collected, recrystallized several times from isopropyl alcohol and found to melt at about 210–213° C. with decomposition.

Analysis—Calculated for $C_{20}H_{25}O_2N_2Cl$: C. 66.56; H. 6.98; N. 7.76. Found: C. 66.6; H. 7.02; N. 7.54.

EXAMPLE II

*Salt of penicillin G and alpha-phenyl-beta-piperidinoethyl carbanilate*

α-Phenyl-β-piperidinoethyl carbanilate hydrochloride (0.198 g.) is suspended in 5 cc. water and added to a solution of 0.198 grams of sodium penicillin G in 6.0 cc. of water. Upon scratching and cooling, the crystalline salt of penicillin G and α-phenyl-β-piperidinoethyl carbanilate precipitates and is collected by filtration. This salt has a potency of about 900 units/mgm. and is soluble in water at room temperature to the extent of about 100 units/cc.

EXAMPLE III

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 mole (13 grams) of freshly liberated α-phenyl-β-piperidinoethyl carbanilate in 50 ml. of ether. Crystalline penicillin G salt of α-phenyl-β-piperidinoethyl carbanilate precipitates and is collected by filtration.

While the present invention has been described with particular reference to the α-phenyl-β-piperidinoethyl carbanilate salt of penicillin G it will be understood that the α-phenyl-β-piperidinoethyl carbanilate salts of other penicillins are also included within the scope of this invention. For instance, penicillins such as the penicillins G, F, X, dihydro F, O and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the ethereal solution of the free base may be prepared in ether by the use of caustic to liberate the free amine from an organic-solvent soluble or water soluble salt such as the hydrochloride, phosphate, nitrate hydrobromide, sulfate, citrate, acetate, and tartrate.

It will be understood that, without departing from the spirit of the invention or the scope of the claims, various modifications may be made in the specific expedients described as these are illustrative only.

We claim:

1. A salt of penicillin and α-phenyl-β-piperidinoethyl carbanilate.
2. A salt of penicillin G and α-phenyl-β-piperidinoethyl carbanilate.
3. A salt of penicillin O and α-phenyl-β-piperidinoethyl carbanilate.
4. A salt of penicillin dihydro F and α-phenyl-β-piperidinoethyl carbanilate.

References Cited in the file of this patent

UNITED STATES PATENTS

| Number | Name | Date |
|---|---|---|
| 2,547,640 | Goldman | Apr. 3, 1951 |
| 2,578,641 | Cooper | Dec. 11, 1951 |
| 2,598,508 | Cooper | May 27, 1952 |